(12) United States Patent
Hatton et al.

(10) Patent No.: US 11,603,951 B2
(45) Date of Patent: Mar. 14, 2023

(54) PINNED COMPOSITE PIPE END-FITTING

(71) Applicant: Magma Global Limited, Portsmouth (GB)

(72) Inventors: Stephen Anthony Waverley Hatton, Woking (GB); Tobias Francis Capell, Waterlooville (GB); Joao Andre Curralo Tavares, New Malden (GB)

(73) Assignee: Magma Global Limited, Portmouth (GB)

( * ) Notice: Subject to any disclaimer, the term of this patent is extended or adjusted under 35 U.S.C. 154(b) by 264 days.

(21) Appl. No.: 16/087,026

(22) PCT Filed: Mar. 16, 2017

(86) PCT No.: PCT/GB2017/050720
§ 371 (c)(1),
(2) Date: Sep. 20, 2018

(87) PCT Pub. No.: WO2017/163021
PCT Pub. Date: Sep. 28, 2017

(65) Prior Publication Data
US 2019/0101233 A1  Apr. 4, 2019

(30) Foreign Application Priority Data
Mar. 24, 2016  (GB) ...................... 1605094

(51) Int. Cl.
*F16L 23/02* (2006.01)
*F16L 23/024* (2006.01)
*F16L 47/14* (2006.01)

(52) U.S. Cl.
CPC ............. *F16L 23/024* (2013.01); *F16L 47/14* (2013.01); *F16L 23/02* (2013.01); *Y10T 29/49826* (2015.01)

(58) Field of Classification Search
CPC ....... F16L 23/024; F16L 47/14; F16L 19/005; F16L 19/02; F16L 19/025; F16L 19/0286;
(Continued)

(56) References Cited

U.S. PATENT DOCUMENTS 1,809,313 A    6/1931  Root
4,185,472 A *  1/1980  Yates
(Continued)

FOREIGN PATENT DOCUMENTS

CN    2616783 Y    5/2004
FR    2 641 841 A1  7/1990
(Continued)

*Primary Examiner* — Zachary T Dragicevich
*Assistant Examiner* — William S. Choi
(74) *Attorney, Agent, or Firm* — Levy & Grandinetti

(57) ABSTRACT

A composite pipe termination is provided. The composite pipe includes a composite pipe wall thickness and a cut end. An annular part of composite material is attached around the outside of the composite pipe at the cut end. The annular part has a radial thickness which tapers towards the composite pipe in the direction along the composite pipe away from the cut end to provide an exterior surface having a tapered portion. A pinning structure includes one or more pins which extend through the annular part and partially through the composite pipe wall thickness to further attach the annular part to the composite pipe.

7 Claims, 2 Drawing Sheets

(58) Field of Classification Search
CPC . F16L 19/0206; F16L 19/0231; F16L 21/065; F16L 23/02; F16L 25/026; F16L 25/06; F16L 58/1009; F16L 58/184; F16L 58/185
USPC ... 285/18, 91, 353, 354, 356, 363, 366, 387, 285/393, 410, 413
See application file for complete search history.

(56) References Cited

U.S. PATENT DOCUMENTS

| | | | |
|---|---|---|---|
| 4,634,314 | A | 1/1987 | Pierce |
| 5,288,109 | A | 2/1994 | Auberon et al. |
| 5,330,236 | A | 7/1994 | Peterjohn et al. |
| 5,332,049 | A * | 7/1994 | Tew |
| 8,302,633 | B2 * | 11/2012 | Saltel |
| 9,303,682 | B2 * | 4/2016 | Sohl |
| 2002/0157718 | A1 * | 10/2002 | Mason |
| 2010/0266790 | A1 * | 10/2010 | Kusinski |

FOREIGN PATENT DOCUMENTS

| | | |
|---|---|---|
| GB | 1 238 230 | 7/1971 |
| GB | 2496872 A | 5/2013 |
| GB | 2526986 A | 12/2015 |
| GB | 2527223 A | 12/2015 |
| WO | WO 2014/023943 A1 | 2/2014 |

* cited by examiner

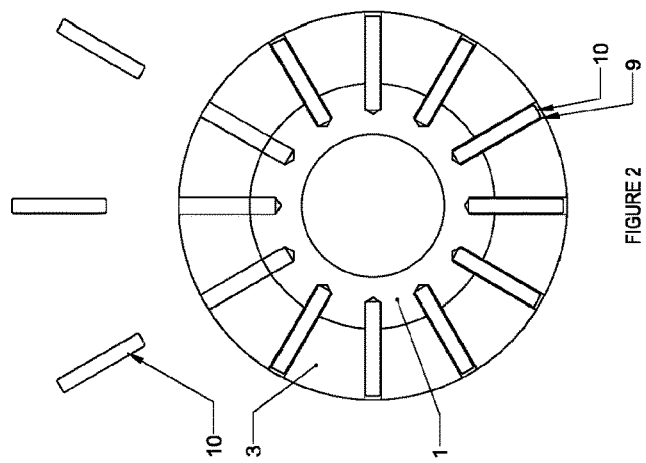
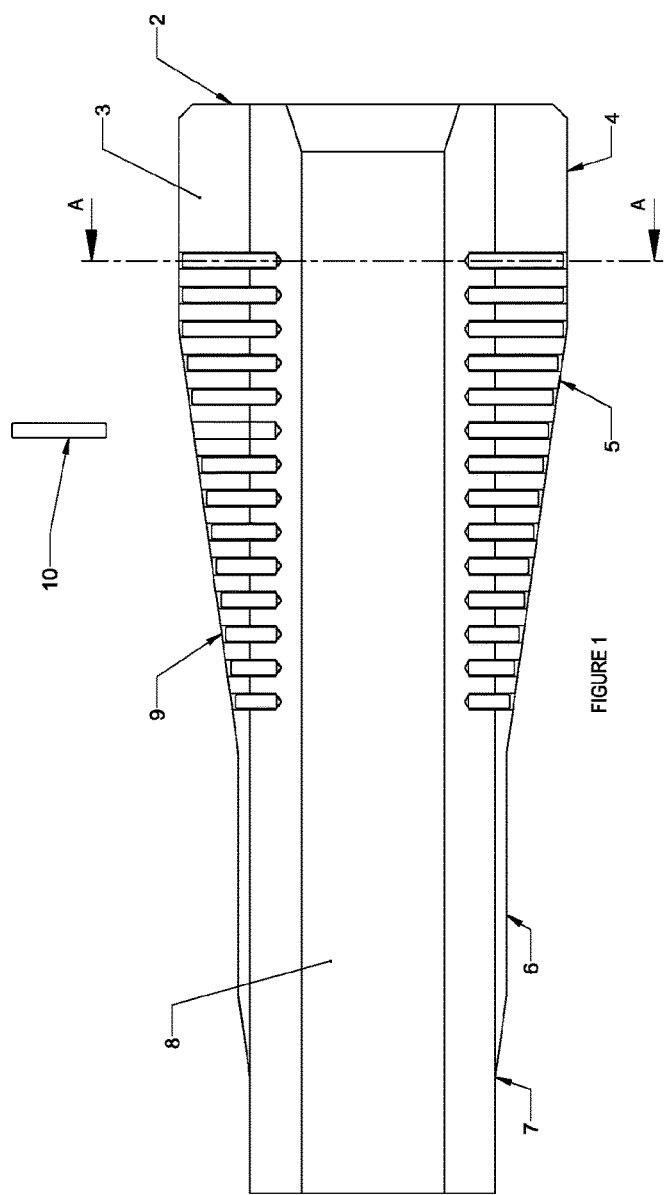

PINNED COMPOSITE PIPE END-FITTING

FIELD OF THE INVENTION

The present invention relates to the attachment of composite pipe to metal pipe or structure for use in the field of hydrocarbon exploration and production offshore.

DESCRIPTION OF THE RELATED ART

Subsea oil and gas drilling and development employs pipes to transport hydrocarbons from the seabed to the sea surface and to transport injection fluids from the surface to the seabed. These pipes were typically made from steel or from combinations of materials, such as steel wires combined with a plastic liner, which together form a flexible steel pipe.

Over time, the subsea depths at which hydrocarbons are extracted has tended to increase. This development has been accompanied by a need to handle more aggressive fluids, higher operating pressures and harsher environmental conditions. In order to address these challenges, the industry has turned to composite pipes, comprising reinforced polymer. These are typically lighter and better able to withstand the more severe environments as well as the more complex dynamic loading conditions including tension, bending and internal/external pressure found deep below the sea surface.

An obstacle to the introduction of such composite pipes has been the ability to reliably terminate such composite pipes and to reliably connect them to one another at both subsea and surface interfaces.

Composite pipe terminations and connections must also be able to provide a reliable transition from the composite pipe material to a standard steel pipe, which may typically incorporate a steel flange or hub connection. This transition represents an additional difficulty, because of the different structural properties of the two materials on the one hand and the differences in thermal expansion on the other, which together make it challenging to effect both a reliable structural and sealing connection.

FR 2 641 841 A describes a process for integrating a metallic coupling member into a composite pipe. This is achieved by winding polymer-impregnated fibres around both a cylindrical mandrel to make the pipe, and the metallic coupling member adjacent to the mandrel. Once winding is complete, the fibres are shrunk around the metallic coupling member, after which a final polymerization takes place. The metallic coupling member has a region of expanded diameter to prevent it from shearing away from the fibres in which it is encased.

Such a method of providing a composite pipe end termination is applicable to thermoset pipes manufactured from a process called "winding", wherein polymer-impregnated fibres are wound around the pipe then subsequently cured, typically by heating. A limitation of this method is that it requires a precise knowledge of the pipe length at the start of the process, so that the pipe termination can be built into the pipe end during pipe manufacture. This process does not allow a pipe of nominal length to be manufactured then subsequently cut to the desired length and terminated in this manner. Additionally, this process relies upon overwrapping of metallic parts with composite materials and experience has shown that such interfaces readily crack due to the stiffness and thermal expansion differentials between composite and metallic components, particularly where carbon fibre is used.

U.S. Pat. No. 4,634,314 A describes a way of connecting a steel flange to a composite pipe. According to this approach, the steel flange is machined with an inner mandrel that is configured to be inserted into the composite pipe and with an outer sleeve that is configured to fit around the outside of the composite pipe. This arrangement forms a "sandwich" of composite pipe between the inner steel mandrel and outer steel sleeve. The approach has the disadvantage that the mandrel restricts the pipe bore, causing pressure drops and local erosion. Additionally, it may prevent the running of inspection and cleaning equipment, such as pipeline "pigs", past the mandrel.

U.S. Pat. No. 5,288,109 A describes an approach by which a composite pipe can be cut to an appropriate length and a metallic end fitting attached, by first inserting an inner mandrel followed by an outer sleeve to form a "sandwich" again. The assembly is then secured by pinning through the outer sleeve, through the composite pipe and into the inner mandrel. Whilst this approach resolves the need to define an exact pipe length prior to manufacture, it suffers from the same problem as U.S. Pat. No. 4,634,314 A, in that the mandrel restricts the pipe bore. Furthermore, the robustness of the connection is limited by its lack of axial or radial preload which increases its susceptibility to fatigue failure.

WO 2014/023943 A1 describes an approach which allows a composite pipe to be cut to a desired length. After it is cut, the composite pipe end is then built up with additional composite material which is configured to taper away from the pipe end. Following this, a metallic sleeve configured to mate with the taper is forced over the built-up region and locked to a connector for a metal or other pipe, which is sealingly engaged with and in fluid communication with the composite pipe. This approach allows pipe of a tailored length to be terminated and it does not restrict the pipe bore. Furthermore, the metallic sleeve is forced onto the built-up region to apply an axial and radial pre-load, which reduces the likelihood of fatigue failure.

A limitation of this arrangement is the structural reliance on the shear strength of the composite material which is defined by the polymer strength rather than that of the reinforcing fibres comprised within the composite. It is possible under high axial load for the end fitting to fail at the interface between the built up material and the composite pipe, resulting in the built up material shearing off.

It is against this background that the present invention has been devised.

SUMMARY OF THE INVENTION

According to a first aspect of the invention, a composite pipe termination is provided, comprising:
  a composite pipe having a composite pipe wall thickness and a cut end;
  an annular part of composite material attached around the outside of the composite pipe at the cut end, the annular part having a radial thickness which tapers towards the composite pipe in the direction along the composite pipe away from the cut end to provide an exterior surface having a tapered portion;
  pinning means comprising one or more pins which extend through the annular part and partially through the composite pipe wall thickness to further attach the annular part to the composite pipe.

As used herein, the term "composite" in relation to the "composite pipe" and the material of the annular part means a polymer matrix comprising reinforcing fibres.

As used herein, the term "composite pipe wall thickness" includes the thickness of any liner, if present.

The function of the pinning means is to provide additional resistance to shear loads and to avoid shear failure when the pipe is loaded axially. This is achieved according to the invention without compromising the ability to withstand high internal pressure.

It is an important aspect of the invention that the one or more pins, and the bores into which the pins fit, do not extend fully through the composite pipe wall thickness and into the composite pipe bore. This reduces the possibility of leakage and the possibility of corrosion/degradation caused by leaked materials. As explained above, pipes are required to transport more and more aggressive fluids, including acidic materials. Pipes and liners in the present field are typically made of materials which have very high resistance to corrosion and degradation when exposed to such fluids, so it is important not to compromise that aspect by allowing fluids opportunities to escape. In the present case, in order to achieve the requisite structural properties, the one or more pins may be made of metal, especially steel, which would be susceptible to attack and corrosion by the transported fluids. As a result of such corrosion, the enhanced strength of the attachment between the annular part and the pipe could be compromised with time, were the pins to extend fully through the composite pipe wall thickness and be exposed to the transported fluids.

Advantageously, the one or more pins extend less than or equal to 80%, preferably from 30% to 60%, more preferably from 40% to 50% of the way through the composite pipe wall thickness.

It is beneficial if the pinning means comprise one or more pins which extend through the tapered portion and partially through the underlying composite pipe wall thickness.

If the pinning means comprises more than one pin, then each pin may extend a different distance through the pipe wall thickness to one or more of the other pin(s). Alternatively, every pin they may extend the same distance through the pipe wall thickness. It is beneficial if all of the pins extend the same distance through the pipe wall thickness to ensure uniform transfer of stress from the annular part.

Advantageously, the annular part comprises a portion of constant maximum radial thickness at the cut end and, adjacent thereto, a portion of radial thickness which tapers in the direction along the composite pipe away from the cut end. In such a case, it is beneficial if the pinning means comprise one or more pins which extend through the portion of constant maximum thickness and partially through the underlying composite pipe wall thickness and one or more pins which extend through the tapered portion and partially through the underlying composite pipe wall thickness.

It is advantageous if the tapered portion of the annular part tapers at an angle which is from 1 degree to 30 degrees, preferably from 5 degrees to 25 degrees to the exterior surface of the composite pipe to which the annular part is attached.

According to one embodiment, the annular part may comprise one or more further tapered portions and one or more further portions of constant thickness.

It is beneficial if the annular part has a maximum radial thickness of more than 1.0, preferably from 1.25 to 4.0, more preferably from 1.5 to 2.5 times the pipe wall thickness. Advantageously, the annular part extends along the composite pipe from the cut end a distance which is from 1.5 to 10, preferably from 3 to 6 times the exterior diameter of the composite pipe.

The or each pin comprised within the pinning means may extend radially or at an angle to the radial, for example such that a pin is angled away from the cut end. Advantageously, the pin or each pin comprised within the pinning means according to the invention is arranged to extend radially.

It is beneficial for the pinning means to comprise two or more pins. Advantageously, the two or more pins form one or more circumferential line(s) of pins around the annular part. Preferably, the pins in a circumferential line are spaced equidistantly from each other. More preferably, there is an even number of pins in the circumferential line or each circumferential line of pins. In such a case, the circumferential line of pins or each circumferential line of pins advantageously comprises an even number from 2 to 36, preferably an even number from 4 to 24, pins. If there are more than two circumferential lines of pins, then it is also advantageous for the circumferential lines of pins to be spaced equidistantly from one another. Each of these aspects of how the pins are arranged, taken on its own or in combination with one or more of the others, may tend to increase effectiveness of the attachment between the annular part and the composite pipe and thereby reduce the likelihood of failure of that connection.

The additional resistance to shear loads provided by the pins is proportional to the sum of the pins' cross sectional areas. To achieve an appropriate total cross sectional area, the skilled person may elect to use a larger number of small diameter pins or a smaller number of larger diameter pins. This will depend, among other things, upon the required axial performance of the composite pipe termination and end fitting and upon the material of manufacture of the pin(s).

The pins may be made of metal or a composite comprising carbon fibre. If the pins are made of metal, then they may be made of steel, or titanium or a mixture thereof. As discussed above, the pins are preferably made of metal, more preferably of steel.

The pins are advantageously cylindrical in shape and may have any appropriate cross-section, but are beneficially circular in cross-section. The ends of each pin may be cut square for ease of manufacture or alternatively manufactured with a fillet to assist with insertion and to provide a close fit in the bottom of the corresponding bore and avoid air gaps.

The polymer comprised within the composite is advantageously a thermoplastic polymer and preferably comprises polyether ether ketone (PEEK). The reinforcing fibres comprised within the composite are advantageously carbon fibres, glass fibres, or mixtures thereof.

According to a second aspect of the invention, a composite pipe end fitting is provided comprising the composite pipe termination of the first aspect of the invention and additionally comprising:

an annular metal sleeve having an interior surface which mates with the exterior surface of the annular part including the tapered portion and having an annular extension portion, which extends beyond the cut end;

a transition piece for interfacing with a metal pipe, the transition piece having a conduit therethrough to allow fluid communication between the transition piece and the composite pipe and between the transition piece and any connected metal pipe;

locking means for locking the transition piece into sealing engagement with the annular extension portion.

The transition piece preferably comprises a proximal flange which mates with the cut end within the extension portion and a distal connector for attachment to a metal pipe.

Advantageously, according to the second aspect of the invention, the annular extension portion comprises an internal thread on an interior surface of the annulus and the locking means comprises a locking ring with an external thread on an exterior surface which cooperates with the internal thread to lock the proximal flange to the extension portion.

The distal connector according to the second aspect of the invention may be a flange or a hub.

Advantageously, the annular metal sleeve, the transition piece and the locking ring according to the second aspect of the invention are made of steel.

According to a third aspect of the invention, a method of providing a composite pipe termination is provided, comprising the steps of:
- providing a composite pipe having a composite pipe wall thickness;
- cutting the composite pipe to a desired length to expose a cut end;
- attaching additional composite material in the form of an annular part around the outside of the composite pipe at the cut end;
- tapering a radial thickness of the annular part towards the composite pipe in a direction along the composite pipe away from the cut end to provide an exterior surface having a tapered portion;
- providing one or more bores, the bore or each bore extending through the annular part and partially through the composite pipe wall thickness
- providing pinning means comprising a close-fitting pin corresponding to the bore or each bore;
- further attaching the annular part to the composite pipe by introducing a close-fitting pin into the bore or each bore.

Methods of manufacture of composite pipe are known in the art, for example from GB 2 527 223 A and GB 2 526 986 A. An advantage of composite pipes, such as those described in these patent applications, is that, they have a low density when compared with metal pipe, and they are better able to withstand the harsh environments involved in subsea hydrocarbon extraction than metal pipe. In addition, they can be manufactured in long lengths and spooled on a reel to be stored and transported.

Following composite pipe manufacture, the pipe is cut, using methods known in the art, to expose a cut end. The composite pipe is typically cut orthogonally to its main axis to generate the desired length and to provide a square plane end.

Additional composite material is then attached to and built up around the outside of the composite pipe at the cut end to form an annular part. The additional composite material may have a composition which is the same or different from the composite material from which the composite pipe is made, but is advantageously the same. If the composite material of the composite pipe and the annular part are the same, then they will have the same physical and chemical properties, such as thermal expansion properties and load bearing properties. This serves to avoid having differential properties, such as differential rates of thermal expansion, which may lead to the formation of stresses and even rupture in use.

The annular part may be made according to methods known to the skilled person, such as the methods described in GB 2 527 223 A and GB 2 526 986 A for making composite pipe. In one embodiment, a pre-formed tape of fibre-reinforced composite material comprising a thermoplastic polymer matrix is wound around the outside of the composite pipe end to build up the annular part, with appropriate application of heat before, and/or during and/or after winding.

The preferred dimensions of the annular part relative to the composite pipe have already been provided in the discussion of the first aspect of the invention.

A thickness of the annular part is then provided with a taper by machining a radial thickness to incline it towards the composite pipe in a direction along the composite pipe away from the cut end, thereby providing an exterior surface having a tapered portion.

The tapered portion may extend part of the way around or around the entire circumference of the annular part. Advantageously, the taper extends around the entire circumference of the annular part, so that the tapered portion of the annular part is shaped as a frustum. The tapering step is performed using methods known to the skilled person.

The exterior surface of the annular part, including the tapered portion, is configured to mate intimately with the interior surface of a pre-formed, annular metal sleeve, which is discussed below.

After formation of the annular part, one or more bores are provided in the annular part, by methods known to the skilled person, such as drilling. The bore or each bore extends through the annular part and partially through the composite pipe wall thickness. As already explained in relation to the pins of the first aspect of the invention, it is important that the bores do not extend fully through the composite pipe wall thickness and into the composite pipe bore. Advantageously, the bore or each bore is configured to extend less than or equal to 80%, preferably from 30% to 60%, more preferably from 40% to 50% of the way through the composite pipe wall thickness.

It is beneficial if bores are provided which extend through the tapered portion and partially through the underlying composite pipe wall thickness.

Furthermore, as already explained in relation to the pins of the first aspect, the bore or each bore is advantageously configured to extend radially. It is beneficial to provide two or more bores arranged to form one or more circumferential lines of bores around the annular part. Advantageously, the bores in the circumferential line or in each circumferential line are spaced equidistantly from one another. Preferably, the circumferential line of bores or each circumferential line of bores is provided with an even number of bores, preferably an even number from 2 to 36, more preferably an even number from 4 to 24, bores. Furthermore, if there are more than two circumferential lines of bores, then it is beneficial to arrange the bores to be spaced equidistantly from one another.

Pinning means are then introduced into the one or more bores to further attach the annular part to the composite pipe. The pinning means comprise a close-fitting pin corresponding to each bore. Close-fitting is important to ensure a reliable load transfer to the pins and an even load distribution and may be achieved by boring an undersized hole and driving a pin into it using methods known to the skilled person. Additionally, the polymer matrix of the composite may be melted while forcing the pin into the hole. Heat sufficient to melt the polymer may be generated by friction, for example by rotating the pin at high speed as it is introduced into the bore, by ultrasonic vibration, electrically (either directly or by induction) or by a combination of these methods.

Each pin is driven into its corresponding bore so that its exposed end is flush with or sunk beneath the exterior surface of the annular part. If a pin is driven into an exterior surface of the annular part at an angle which is not orthogonal to that surface, then the exposed end of that pin may be partially flush with that exterior surface and partially sunk beneath it.

According to a fourth aspect of the invention, a method of providing a pipe end fitting is provided, comprising the method of the third aspect and the additional steps of:

providing an annular metal sleeve having an interior surface configured to mate with the exterior surface of the annular part including the tapered portion and having an annular extension portion, configured to extend beyond the cut end;

forcing the annular part into the annular metal sleeve to generate a high axial and radial pre-load between the annular part and the annular metal sleeve;

providing a transition piece for interfacing with a metal pipe and locking means for locking the transition piece to the annular extension portion, the transition piece having a conduit therethrough to allow fluid communication between the transition piece and the composite pipe and between the transition piece and any connected metal pipe;

locking the transition piece into sealing engagement with the annular extension portion using the locking means.

The annular metal sleeve is configured to fit around and mate intimately with the annular part, including the tapered portion. The annular metal sleeve may be provided on the composite pipe after cutting to expose the cut end and before manufacture of the composite pipe termination, or it may be provided from the other end of the pipe after manufacture of the composite pipe termination. Initially, the annular metal sleeve is slidable on the composite pipe. Following manufacture of the composite pipe termination, the annular metal sleeve is moved into position, so that the annular extension portion extends beyond the cut end and so that the interior surface of the annular metal sleeve mates with the exterior surface of the annular part, including the tapered portion. This mating is important, because the interface with the tapered portion provides a strong socketing effect and bestows the ability to transmit tension and bending loads to the composite pipe end fitting. The interface and its ability to accommodate external loads is further enhanced by a pre-loading step, wherein the composite pipe is pushed axially into the steel collar using methods known to the skilled person, such as by means of a hydraulic tool. This pre-loading step generates high radial and axial preload between the annular metal sleeve and the composite pipe termination. The preloaded arrangement is then locked into position using locking means.

Sealing with a metal pipe may be provided by a standard sealing method, such as an O-ring, a gasket or a bore seal, which is pressure-energised and disposed on prepared surfaces at the interface between the end of the composite pipe end fitting and the start of the metal pipe.

BRIEF DESCRIPTION OF THE DRAWINGS

The invention will now be further described, by way of example only, and with reference to the accompanying drawings, in which:

FIG. 1 illustrates a side view of a composite pipe termination according to the invention.

FIG. 2 illustrates a cross-section through A-A of the composite pipe of FIG. 1.

DETAILED DESCRIPTION

Figure 3:
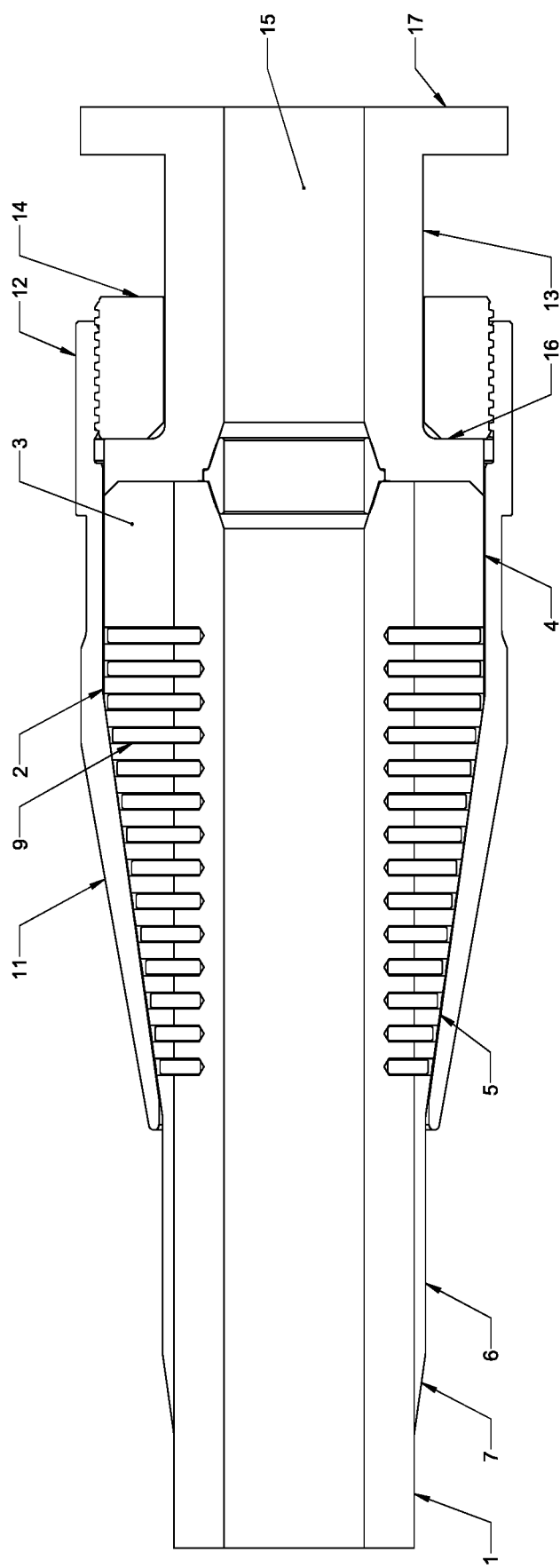
FIG. 3 shows side view of a composite pipe end fitting according to the invention, comprising a composite pipe termination according to the invention.

A detailed description of the invention will now be provided with reference to the above figures.

FIG. 1 shows an embodiment of a composite pipe termination comprising a composite pipe (1), which extends to the cut end (2). A built up region at the cut end forms an annular part (3) around the outside of the cut end. The annular part (3) comprises a portion of constant maximum radial thickness (4) adjacent to the cut end and a tapered portion (5) adjacent to the portion of constant maximum radial thickness, which tapers towards the composite pipe in the direction along the composite pipe away from the cut end. The annular part (3) according to this embodiment comprises a further portion of constant thickness (6) and a further tapered portion (7).

A composite pipe bore (8) extends through the composite pipe (1) to the cut end (2). Radially extending bores (9) have been provided through the annular part, each bore (9) also extending partially through the composite pipe wall thickness. All of the bores (9) according to this embodiment extend partially through the pipe wall thickness to terminate at the same radial depth. The bores (9) according to this embodiment have been provided in fourteen circumferential lines, each line comprising twelve of bores spaced equidistantly from one another, as can be seen from FIG. 2, although the number of circumferential lines of bores and the number of bores in a circumferential line are purely exemplary. Pinning means comprising close-fitting pins (10) are shown already in place inside the majority of bores (9) in FIGS. 1 and 2 to further attach the annular part to the composite pipe. In addition, one pin (10), in the case of FIG. 1, and three pins (10), in the case of FIG. 2, are shown ready to be forced into the bores (9) using methods known to the skilled person.

FIG. 3 shows a composite pipe end fitting, comprising the composite pipe termination illustrated in FIGS. 1 and 2, whereby pinning means has been provided, comprising a close-fitting pin (10) driven into each radial bore (9). A reference numeral in FIG. 3 which is the same as a reference numeral used in FIGS. 1 and 2 has the same meaning as applies to those figures.

As shown in FIG. 3, an annular metal sleeve (11) is provided having an interior surface which mates intimately with the exterior surface of the annular part including, importantly, the tapered portion. The annular metal sleeve also comprises an extension portion (12) which extends beyond the cut end (2) and which comprises a thread on its interior surface. The composite pipe termination has been forced into the annular metal sleeve using tools known to the skilled person, such as hydraulic tools, to generate a high axial and radial pre-load. The annular metal sleeve has then been locked to a transition piece (13) by means of a locking ring (14). The locking ring (14) comprises a thread on an exterior surface which cooperates with the thread on the interior surface of the extension portion (12), such that the locking ring (14) may be threaded onto the extension portion (12) to lock the transition piece (13) to the annular metal sleeve and lock the two together. The transition piece (13) comprises a conduit (15) therethrough, a proximal flange (16) which mates with the cut end of the composite pipe (and also the annular part adjacent the cut end), and a distal connector (17) suitable for attachment to a metal or other pipe (not shown). The proximal flange (16) is forced against the cut end (2) by the locking ring (14). The distal connector (17) in FIG. 3 is a further flange. Pressure-energised sealing means (not shown), such as an O-ring, a gasket or a bore seal, ensure a fluid-tight seal.

The invention claimed is:

1. A method of providing a composite pipe end fitting, comprising:
   providing a composite pipe having a composite pipe wall thickness including a liner;
   cutting the composite pipe to a desired length to expose a cut end;
   attaching additional composite material in the form of an annular part around the outside of the composite pipe at the cut end;
   tapering a radial thickness of the annular part towards the composite pipe in a direction along the composite pipe away from the cut end to provide an exterior surface having a tapered portion;
   providing one or more bores, the bore or each bore extending through the annular part and partially through the composite pipe wall thickness
   providing pinning means comprising a close-fitting pin corresponding to the bore or each bore;
   further attaching the annular part to the composite pipe by introducing a close-fitting pin into the bore or each bore;
   providing an annular metal sleeve having an interior surface configured to mate with the exterior surface of the annular part including the tapered portion and having an annular extension portion, configured to extend beyond the cut end;
   forcing the annular part into the annular metal sleeve to generate a high axial and radial pre-load between the annular part and the annular metal sleeve;
   providing a transition piece, the transition piece directly mates with and has a proximal flange which mates with the cut end within the extension portion and a distal connector for attachment to a metal pipe, for interfacing with the metal pipe and locking means for locking the transition piece to the annular extension portion, the transition piece having a conduit therethrough to allow fluid communication between the transition piece and the composite pipe and between the transition piece and any connected metal pipe; and
   locking the transition piece into sealing engagement with the annular extension portion using the locking means.

2. The method of claim 1, comprising configuring the bore or each bore to extend less than or equal to 80% of the way through the composite pipe wall thickness.

3. The method of claim 1, comprising configuring the bore or each bore to extend radially.

4. The method of claim 1, comprising providing two or more bores arranged to form one or more circumferential lines of bores around the annular part.

5. The method of claim 4, comprising arranging the bores in the circumferential line or in each circumferential line to be spaced equidistantly from one another.

6. The method of claim 4, comprising providing the circumferential line of bores or each circumferential line of bores with an even number from 2 to 36 bores.

7. The method of claim 4, comprising providing more than two circumferential lines of bores and arranging the circumferential lines of bores to be spaced equidistantly from one another.

* * * * *